(12) United States Patent
Idowu

(10) Patent No.: US 8,549,995 B2
(45) Date of Patent: Oct. 8, 2013

(54) HAND-OPERATED APPLIANCE FOR SHUCKING BLACK-EYED PEA SEED COVERINGS FROM THEIR KERNELS

(76) Inventor: Olajire Idowu, Lodi, CA (US)

(*) Notice: Subject to any disclaimer, the term of this patent is extended or adjusted under 35 U.S.C. 154(b) by 18 days.

(21) Appl. No.: 13/374,277

(22) Filed: Dec. 20, 2011

(65) Prior Publication Data

US 2013/0152804 A1 Jun. 20, 2013

(51) Int. Cl.
*A47J 17/00* (2006.01)
*A23N 5/00* (2006.01)

(52) U.S. Cl.
USPC ............ 99/568; 99/495; 99/537; 99/538; 99/539; 99/540; 99/569; 99/570; 99/571; 99/572; 99/573; 99/574; 99/575; 99/576; 99/577; 99/578; 99/579; 99/580; 99/581; 99/582; 30/120.1; 30/120.2; 30/120.3; 30/120.5; 426/481; 426/482

(58) Field of Classification Search
USPC .......... 99/495, 537–540, 568–582; 30/120.1, 30/120.2, 120.3, 120.5; 426/481, 482
See application file for complete search history.

(56) References Cited

U.S. PATENT DOCUMENTS

| 435,235 | A | * | 8/1890 | Maxson | 241/169.1 |
|---|---|---|---|---|---|
| 699,529 | A | * | 5/1902 | Hutchinson | 99/577 |
| 731,986 | A | * | 6/1903 | Warren | 241/84.3 |
| 771,885 | A | * | 10/1904 | Poirier | 460/15 |
| 989,542 | A | * | 4/1911 | Couch | 99/602 |
| 2,611,952 | A | * | 9/1952 | Chambers | 30/116 |
| 2,700,995 | A | * | 2/1955 | Ritter | 241/278.1 |
| 2,771,365 | A | * | 11/1956 | Mininberg | 426/19 |
| 2,842,176 | A | * | 7/1958 | Bowland | 241/89.4 |
| 2,858,081 | A | * | 10/1958 | Sinkinson | 241/169.1 |
| 2,867,255 | A | * | 1/1959 | Berney et al. | 241/273.2 |
| 2,880,734 | A | * | 4/1959 | Edstrom | 460/65 |
| 2,974,887 | A | * | 3/1961 | Grandinetti | 241/101.2 |
| 2,986,346 | A | * | 5/1961 | Rozmus | 241/169 |
| 3,054,433 | A | * | 9/1962 | Lucidi | 426/288 |
| 3,098,515 | A | * | 7/1963 | Forsberg | 99/519 |
| 3,148,839 | A | * | 9/1964 | Danforth | 241/21 |
| 3,347,295 | A | * | 10/1967 | Feiling | 99/628 |
| 3,419,056 | A | * | 12/1968 | Girgis | 426/482 |
| 3,427,690 | A | * | 2/1969 | Haug | 19/66 R |
| 3,435,524 | A | * | 4/1969 | Moore | 83/761 |
| 3,581,790 | A | * | 6/1971 | Conte | 241/88.1 |
| 3,587,982 | A | * | 6/1971 | Campbell | 241/62 |
| 3,633,834 | A | * | 1/1972 | Nissen | 241/169.1 |
| 3,651,814 | A | * | 3/1972 | Vander Zanden | 460/107 |
| 3,721,180 | A | * | 3/1973 | Strang | 99/571 |
| 3,734,752 | A | * | 5/1973 | Headley | 426/481 |
| 3,745,913 | A | * | 7/1973 | Hobbs | 99/625 |
| 3,817,256 | A | * | 6/1974 | Buchele et al. | 460/46 |
| 3,856,022 | A | * | 12/1974 | Buchele et al. | 460/46 |
| 3,884,105 | A | * | 5/1975 | Fessler et al. | 83/419 |

(Continued)

*Primary Examiner* — Henry Yuen
*Assistant Examiner* — Eric Stapleton
(74) *Attorney, Agent, or Firm* — Robert Charles Hill

(57) ABSTRACT

A hand-held, manually operated seed shucking appliance enables a food preparer to remove the seed coverings of black-eyed peas from their kernels. A spring and piston inside a chamber are arranged to compress a load of pre-soaked black-eyed peas against a shuttle rasp threaded between side slots. As a user manipulates the shuttle rasp, the shucks are scraped off the seeds by a scraping surface and both pass through the side slots. The piston is configured to be cocked back such that the chamber can be loaded through one end with a fresh charge of black-eyed peas.

4 Claims, 7 Drawing Sheets

(56) References Cited

U.S. PATENT DOCUMENTS

| | | | |
|---|---|---|---|
| 3,924,326 A * | 12/1975 | Di Gaetano | 30/120.2 |
| 3,962,479 A * | 6/1976 | Coldren | 426/532 |
| 3,964,715 A * | 6/1976 | Burgess, Jr. | 241/7 |
| 4,023,478 A * | 5/1977 | Shaw | 99/628 |
| 4,052,992 A * | 10/1977 | Taylor | 460/142 |
| 4,066,087 A * | 1/1978 | Rodgers | 460/142 |
| 4,127,375 A * | 11/1978 | Nelson | 425/313 |
| 4,137,924 A * | 2/1979 | White | 460/133 |
| 4,143,665 A * | 3/1979 | Griffin | 460/104 |
| 4,196,224 A * | 4/1980 | Falk | 426/483 |
| 4,212,430 A * | 7/1980 | Dale et al. | 241/89.4 |
| 4,245,553 A * | 1/1981 | Nakamura | 99/628 |
| 4,366,930 A * | 1/1983 | Trombetti, Jr. | 241/169 |
| 4,370,922 A * | 2/1983 | Rollband | 99/572 |
| 4,377,970 A * | 3/1983 | Kenkel | 99/572 |
| 4,466,343 A * | 8/1984 | Thompson | 99/572 |
| 4,520,719 A * | 6/1985 | Price | 99/578 |
| 4,598,637 A * | 7/1986 | Brown et al. | 99/580 |
| 4,848,221 A * | 7/1989 | Borba | 99/625 |
| 4,968,694 A * | 11/1990 | Madsen et al. | 514/23 |
| 4,978,078 A * | 12/1990 | Vadnay | 241/74 |
| 4,996,917 A * | 3/1991 | Burlock et al. | 99/575 |
| 5,039,534 A * | 8/1991 | Adams et al. | 426/231 |
| 5,070,617 A * | 12/1991 | Frederiksen et al. | 30/120.2 |
| 5,218,899 A * | 6/1993 | Jacobs | 99/609 |
| 5,233,747 A * | 8/1993 | Johnson | 30/120.2 |
| D343,985 S * | 2/1994 | Rath | D7/369 |
| 5,307,738 A * | 5/1994 | Amstad | 99/625 |
| D362,598 S * | 9/1995 | Kibbe | D7/678 |
| D368,202 S * | 3/1996 | Goble | D7/372 |
| 5,516,048 A * | 5/1996 | Falk | 241/7 |
| 5,533,265 A * | 7/1996 | Samuelson | 30/120.2 |
| 5,533,683 A * | 7/1996 | Fay et al. | 241/169 |
| 5,626,299 A * | 5/1997 | Haynes | 241/169.1 |
| 5,702,061 A * | 12/1997 | Kennedy et al. | 241/93 |
| 5,830,042 A * | 11/1998 | Anderson | 451/59 |
| 5,931,087 A * | 8/1999 | Spencer | 99/575 |
| 5,967,434 A * | 10/1999 | Virk | 241/169.1 |
| 6,015,106 A * | 1/2000 | Turgeon et al. | 241/69 |
| 6,041,697 A * | 3/2000 | Maoz | 99/572 |
| 6,042,863 A * | 3/2000 | George et al. | 426/484 |
| 6,106,390 A * | 8/2000 | Doggrell et al. | 460/141 |
| 6,135,375 A * | 10/2000 | Kaposi et al. | 241/95 |
| 6,237,476 B1 * | 5/2001 | Beauchemin | 99/571 |
| 6,293,407 B1 * | 9/2001 | Bajema | 209/495 |
| 6,347,579 B1 * | 2/2002 | Houri et al. | 99/488 |
| 6,378,213 B1 * | 4/2002 | Griffith | 30/120.2 |
| 6,412,717 B1 * | 7/2002 | Menelaou | 241/92 |
| 6,568,616 B1 * | 5/2003 | Tang | 241/168 |
| 6,647,866 B1 * | 11/2003 | Chih | 99/348 |
| 6,896,214 B2 * | 5/2005 | Wu | 241/169.1 |
| 6,966,510 B2 * | 11/2005 | Pai | 241/169.1 |
| 6,988,622 B1 * | 1/2006 | Victor | 209/162 |
| 7,325,491 B2 * | 2/2008 | Petiziol | 100/265 |
| 7,337,997 B2 * | 3/2008 | Ko | 241/93 |
| 7,444,929 B1 * | 11/2008 | Savage | 99/569 |
| 7,595,072 B2 * | 9/2009 | Heeb et al. | 426/482 |
| 2003/0034411 A1* | 2/2003 | Wong | 241/168 |
| 2004/0200366 A1* | 10/2004 | Koerselman et al. | 99/537 |
| 2008/0190304 A1* | 8/2008 | Sawhney et al. | 99/537 |

* cited by examiner

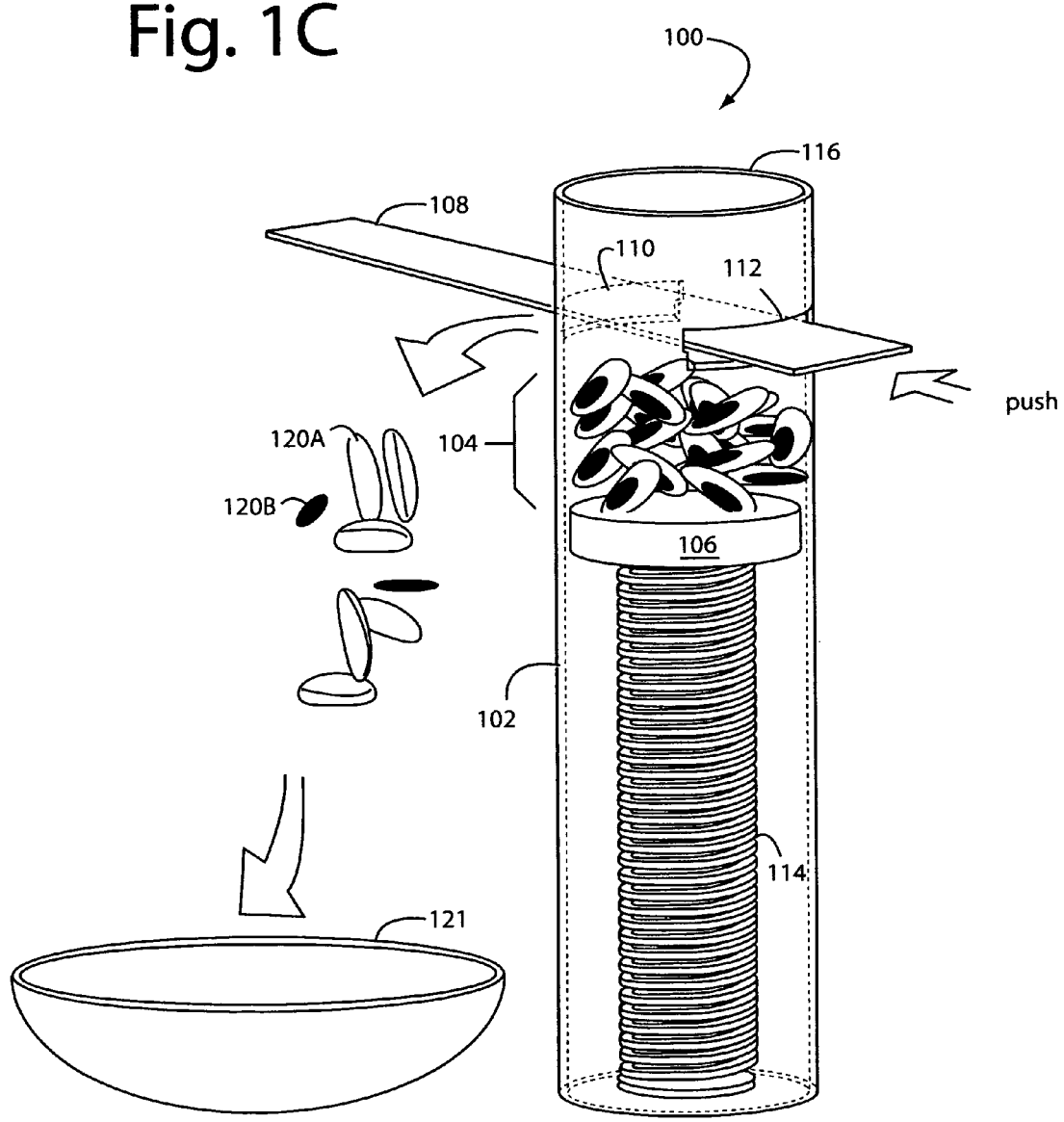

HAND-OPERATED APPLIANCE FOR SHUCKING BLACK-EYED PEA SEED COVERINGS FROM THEIR KERNELS

BACKGROUND OF THE INVENTION

1. Field of the Invention

The present invention relates to methods and apparatus for shucking the skins from the seeds of pre-soaked black-eyed peas. In particular, the present invention relates to hand-held, manually operated devices that compress a load of pre-soaked black-eyed peas inside a chamber against a shuttle rasp threaded between side slots. The seeds and the shucks scraped off are then small enough to pass out through the slots.

2. Description of Related Art

According to the Congo Cookbook, Moyin-Moyin (also called Moin-Moin, Moi-Moi, Moimoi), prepared from black-eyed peas or other beans, is a unique and delicious savory bean pudding. (See, www.congocookbook.com/snack_recipes/moyin_moyin.html) The traditional way to cook Moyin-Moyin is to make a paste ground from the shucked seeds. The paste is wrapped in banana leaves, and then steamed until cooked. In modern Africa, Moyin-Moyin is cooked in tin cans, or muffin pans or tins.

To start, about two cups of whole black-eyed peas are soaked or boiled in water until the skins are soft enough to be shucked by pinching or rubbing them off. The traditional way has been for each cook to manually rub the softened beans together to remove the skins. A rinse is used to wash away the skins and any other debris. The remaining bare seeds are drained in a colander and ground into a paste for the pudding.

Removing the skins, or shucks, from whole black-eyed peas this way is very tedious, labor intensive, and time consuming. Many different food uses of legumes, grains, drupes, silques, achenes, and other seeds call for removing the skins or hulls. The prior art has developed a wide variety of separation and grating methods, only a few of which are affordable and practical for home use.

Many prior art food graters grind the food into shavings without removing any peel, as in cheese graters. Others grind off peels that cannot be removed as skins, as in raw potato peelings. The foods of interest here are, e.g., seeds, peas, or beans where the skins can be removed whole, even if soaking or boiling is needed to soften the skins or seed coverings for complete removal and separation.

SUMMARY OF THE INVENTION

Briefly, a seed shucking embodiment of the present invention for separating the seed coverings of black-eyed peas from their kernels comprises a hand-held, manually operated device with a spring and piston to compress a load of pre-soaked black-eyed peas inside a chamber up against a shuttle rasp threaded between side slots. As a cook or other user manipulates the shuttle rasp, the shucks are scraped off the seeds and both are reduced in size enough to pass out and through the side slots. The piston is configured to be cocked back such that the chamber can be loaded through one end with a fresh charge of black-eyed peas.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIGS. 1A-1D are perspective view diagrams of a seed-shucking appliance embodiment of the present invention for separating the seed coverings of black eyed peas from their kernels. FIG. 1A represents the loading of some black eyed peas and the spring shown fully compressed, FIG. 1B represents the insertion of the shuttle rasp and the release of the piston and spring, FIG. 1C represents a push on the shuttle rasp and a resulting discharge of shucks and seed kernels through a lateral slot, and FIG. 1D represents a pull on the shuttle rasp and another consequential discharge of shucks and seed kernels through an opposite lateral slot;

DETAILED DESCRIPTION OF THE INVENTION

Figure 1A:
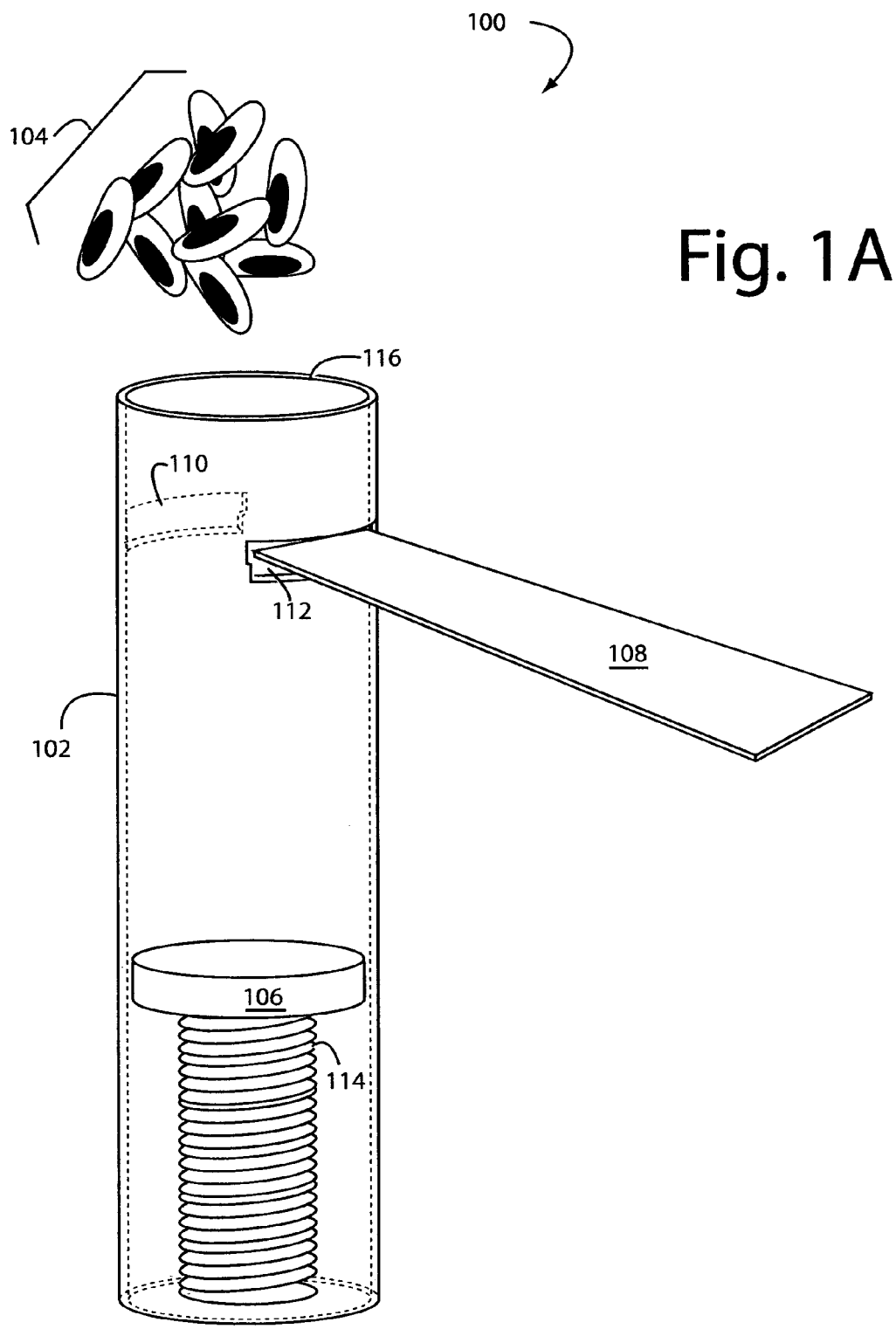

FIGS. 1A-1D represent a seed-shucking appliance embodiment of the present invention for separating the seed coverings of black eyed peas from their kernels, and is referred to herein by the general reference numeral 100. The seed-shucking appliance 100 is intended to be handheld, manually operated, and useful in a typical kitchen. Seed-shucking appliance 100 comprises a hollow, tubular body 102 or chamber inside of which a load of black eyed peas 104 can be introduced and pressed by a piston 106 against a shuttle rasp 108. The tubular body 102 can be made of clear plastic and have a round or rectangular cross section with open ends. Piston 106 is configured to slide easily inside tubular body 102 and contain the load of black eyed peas 104 and any debris resulting from use.

Figure 1B:
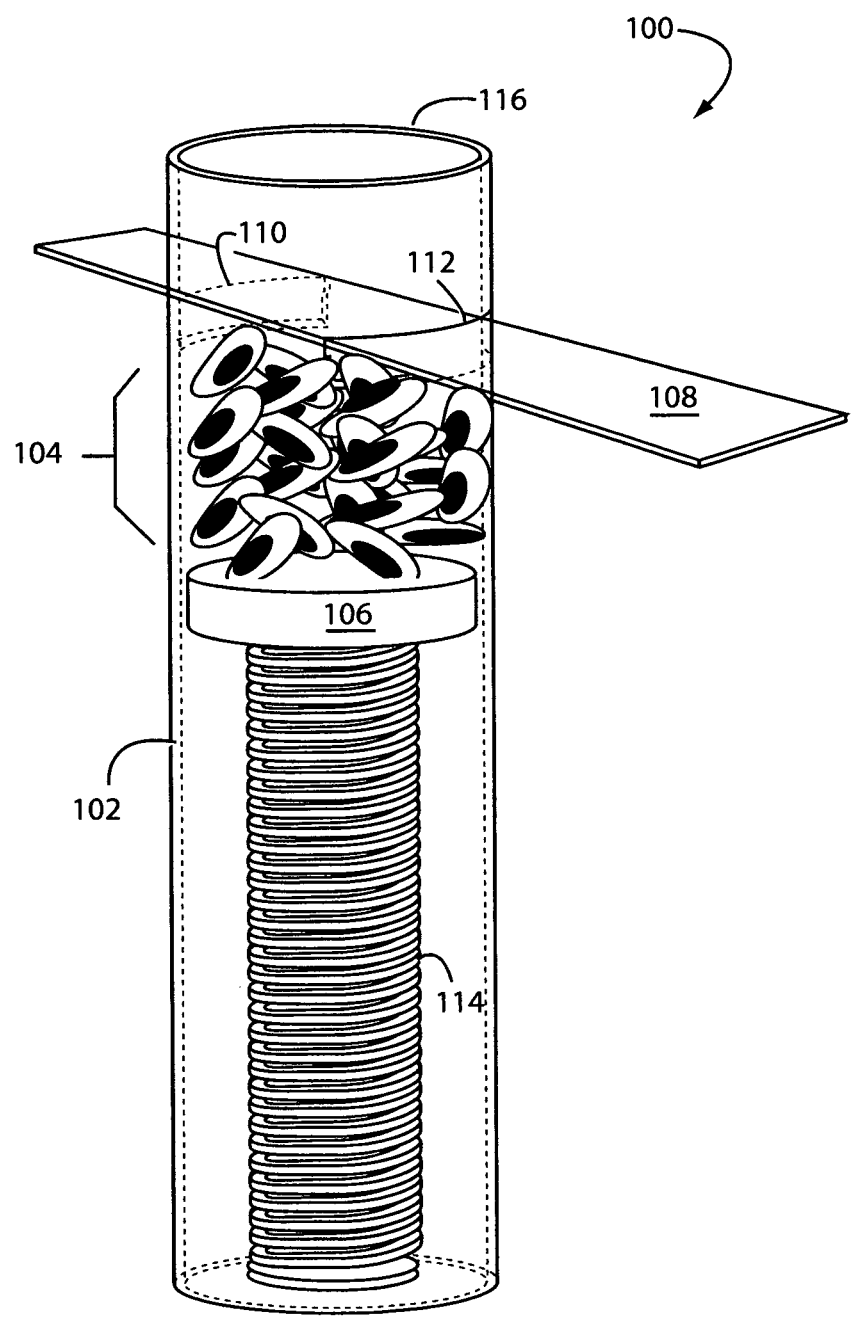

In FIG. 1B, the shuttle rasp 108 can be seen to be fully inserted through matching lateral slots 110 and 112 after the black eyed peas 104 are poured in by a user. The lateral slots 110 and 112 disposed in opposite walls of a chamber and are dimensioned to permit the expulsion of individual black-eyed pea seed kernels and their coverings only after separation.

A spring 114 is configured to released by a cocking or holding mechanism (FIG. 2) to allow the piston to move up and bear on the load of black eyed peas 104. At any time, the user may choose to flip seed-shucking appliance 100 over to allow a first end 116 to rest on a table for better leverage and to allow gravity to assist.

The end of spring 114 opposite to piston 106 is anchored to either a closed end of tubular body 102 or fastened to it with a cap. See FIG. 2. It is desirable for all the pieces to be easily disassembled for cleaning, and it would help in both the operation and cleaning if tubular body 102 was made of a clear glass or plastic material.

The side of shuttle rasp 108 that faces the load of black eyed peas 104 is roughened such that when the user moves it back and forth the shucks of the black eyed peas 104 will be torn off their kernels. The lateral slots 110 and 112 are configured and critically sized to prevent whole ones of black eyed peas 104 from escaping, but nevertheless allow shucks and kernels to escape, as illustrated in FIGS. 1C and 1D.

In FIG. 1C, the shuttle rasp 108 is pushed in toward lateral slot 112 causing shuck 120A and seed kernels 120B to be abraded and separated from one another. These are then small enough to be ejected out through lateral slot 110 that can fall into a bowl 121. A typical family would prepare about two cups of black eyed peas for a single meal.

Figure 1D:
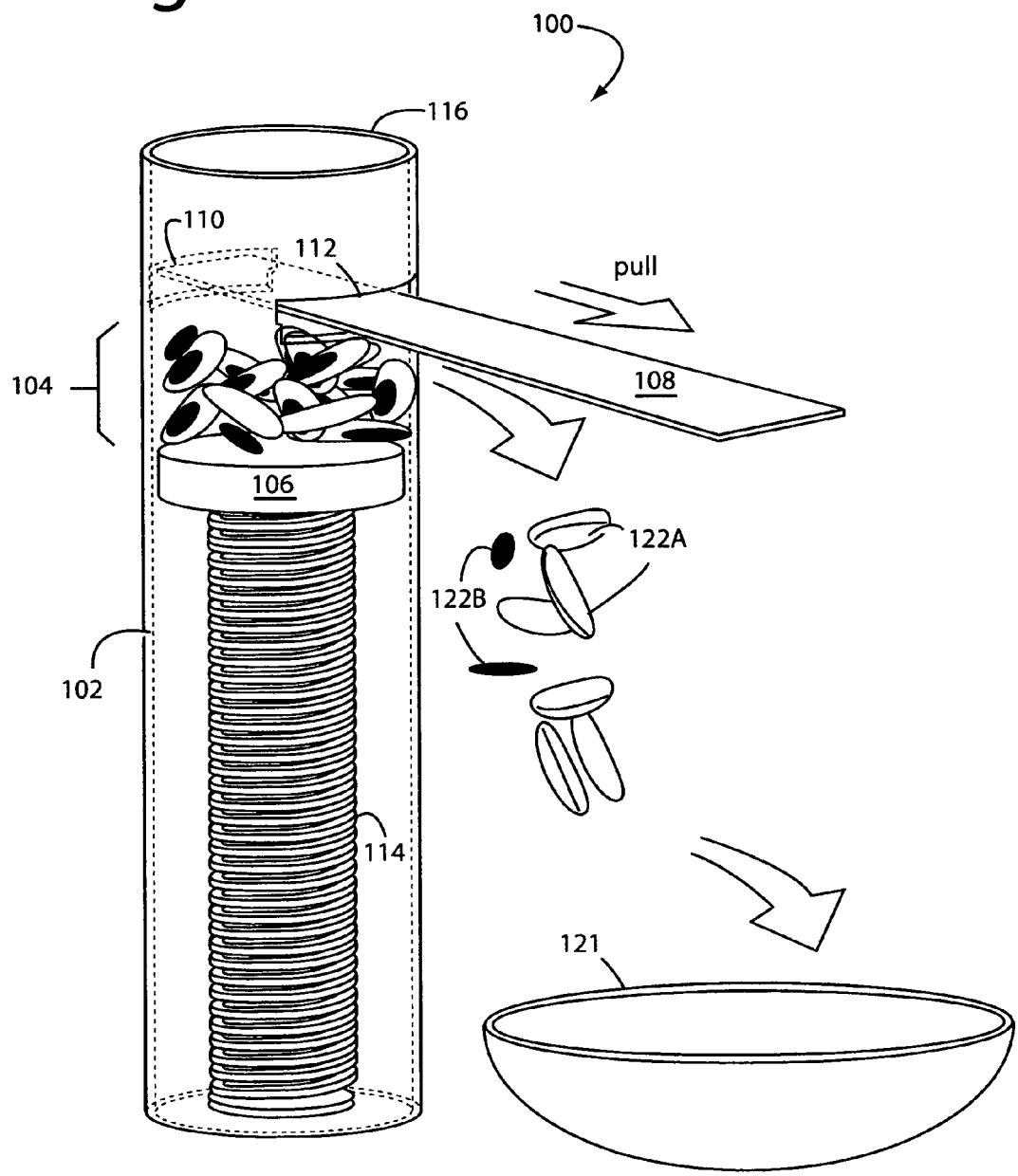

In FIG. 1D, the shuttle rasp 108 is pulled out away from lateral slot 112 causing the shuck 122A and seed kernels 122B to be torn and separated from one another. These bits too are then small enough to be ejected out through lateral slot 112. FIGS. 1C and 1D show the separated seed kernels as simple black dots, and the shucks as rounded, blank ovals.

Figure 2:
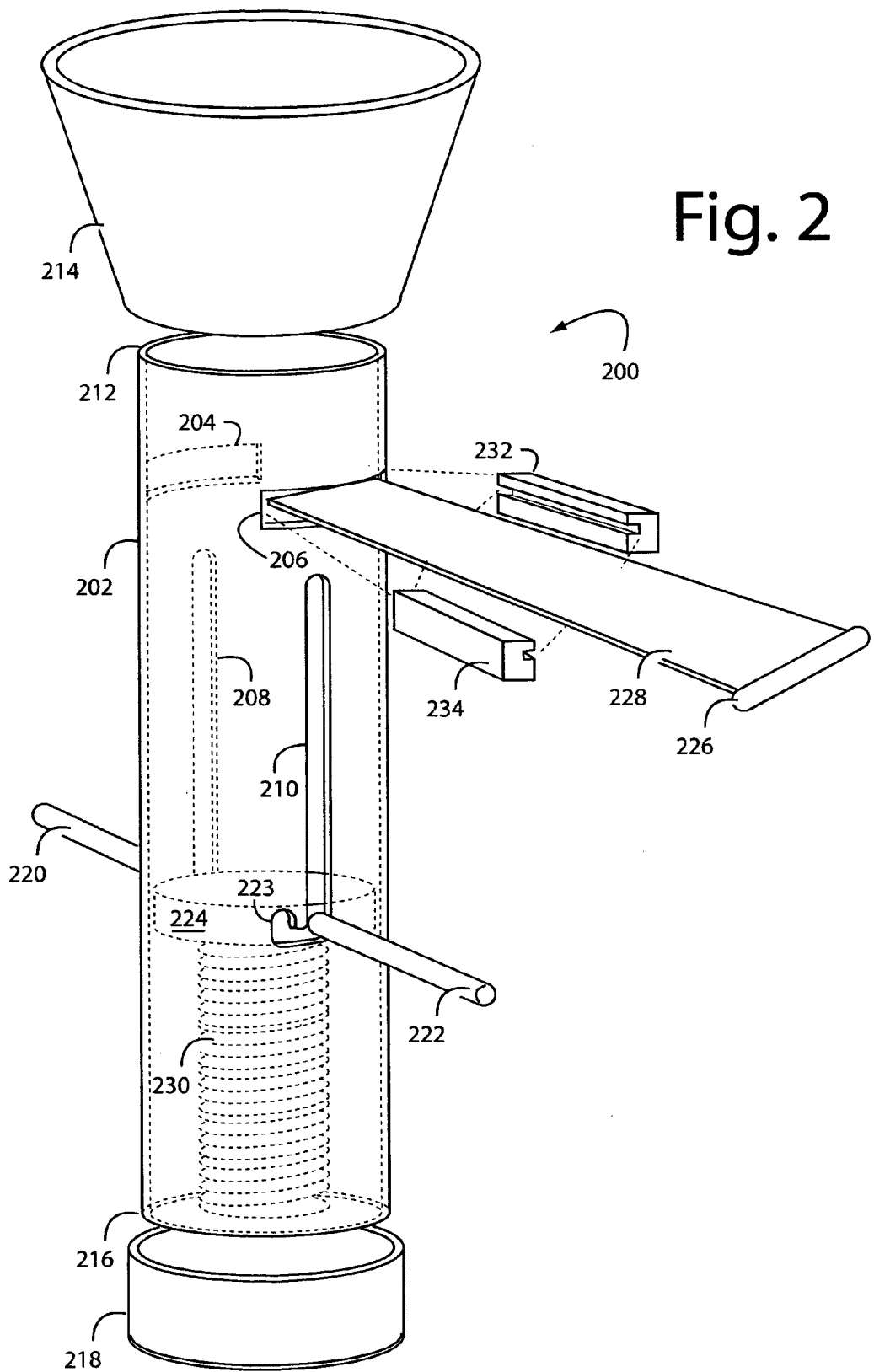
FIG. 2 is a perspective view diagram of a seed-shucking appliance with a funnel, cap, shuttle rasp guides, and holding/cocking mechanism, and is otherwise similar to those of FIGS. 1A-1D.

FIG. 2 represents an alternative seed shucking appliance embodiment of the present invention, and is referred to herein by the general reference numeral 200. An appliance 200 has a tubular body 202 in which two lateral slots 204 and 206 have been cut, and two longitudinal slots 208 an 210 are provided. A top end 212 is fitted with a removable funnel 214, and a bottom end 216 has a snap or screw-on cap 218.

A holding or cocking mechanism can be included to facilitate loading a quantity of black eyed peas through funnel 214 and top end 212. For example, longitudinal slots 208 and 210 can be formed as elongated J-channels to allow a locking action to keep a spring compressed. A pair of handles 220 and 222 are threaded out through longitudinal slots 208 and 210 to allow a user to move an internal piston 224. A hook 223 can be seen in FIG. 2 that prides a locking mechanism with handles 220 and 222 that together can keep spring 230 compressed for loading a chamber above piston 224.

A handle or knob 226 on one end of a reciprocating shuttle rasp 228 provides the user a more comfortable way for a user to manipulate and reciprocate the shuttle rasp 228. Lateral slots 204 and 206 can be fitted with glides 232 and 234 or otherwise constructed to provide for a smooth, wobble-free action with respect to reciprocating shuttle rasp 228.

A compression spring 230 attaches to piston 224 and to the inside bottom of cap 218. A secure way needs to be incorporated to allow a typical user to remove and to fix cap 218 to end 216. For example, by including plastic molded screw threads. In general, the majority of parts can be constructed of plastic, but parts like spring 230, handles 220 and 222, and shuttle rasp 228 would probably best be constructed of metal like stainless steel.

The roughened, abrasive surface of shuttle rasp 228 that faces piston 224 must not be allowed to snag on the adjacent edges of lateral slots 204 and 206. A pair of guides 232 and 234 are included to control shuttle rasp 228 to provide smooth operation. The placement and configuration of guides 232 and 234 are also such that a constant, proper gap of about one half diameter of an averaged sized black eye pea is maintained between the roughened, abrasive surface of shuttle rasp 228 and the opposing edges of the respective lateral slots 204 and 206. Lips (FIG. 4) may also be provided on the shuttle rasp 228 for the same purposes. Many different types of configurations have been developed by others and marketed commercially that would be useful in alternative embodiments.

Figure 3:
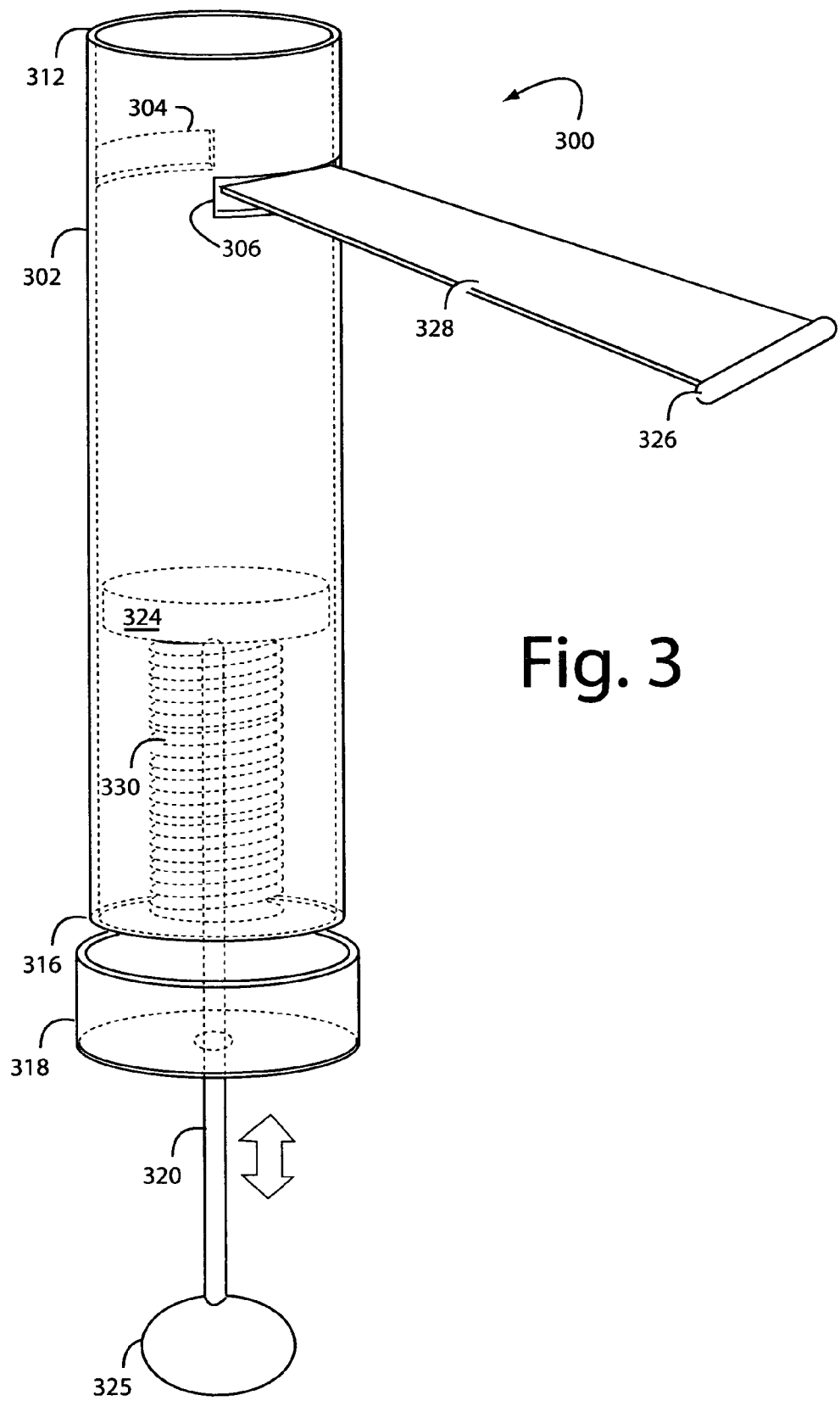
FIG. 3 is a perspective view diagram of a seed-shucking appliance with an alternative holding/cocking mechanism, but is otherwise similar to those shown in FIGS. 1A-1D, and 2.

FIG. 3 represents a seed shucking appliance embodiment of the present invention with an alternative spring cocking mechanism, and is referred to herein by the general reference numeral 300. An appliance 300 has a tubular body 302 in which two lateral slots 304 and 306 have been cut. A top end 312 is fitted with a removable funnel 314, and a bottom end 316 has a snap or screw-on cap 318.

An alternative holding or cocking mechanism is provided to facilitate loading a quantity of black eyed peas through top end 312. A rod 320 is attached to piston 324 and passes out through cap 318 allow a user to pull it down. A distal end of rod 320 has a knob 325 attached.

A handle 326 on one end of a reciprocating shuttle rasp 328 provides the user a more comfortable way for a user to manipulate and reciprocate the shuttle rasp 328. Lateral slots 304 and 306 can be fitted with glides or otherwise constructed to provide for a smooth, wobble-free action with respect to reciprocating shuttle rasp 328.

A compression spring 330 attaches to piston 324 and to the inside bottom of cap 318. A secure way needs to be incorporated to allow a typical user to remove and to fix cap 318 to end 316. For example, by including plastic molded screw threads. In general, the majority of parts can be constructed of plastic, but parts like spring 330, handles 320 and 322, and shuttle rasp 328 would probably best be constructed of metal like stainless steel.

Figure 4:
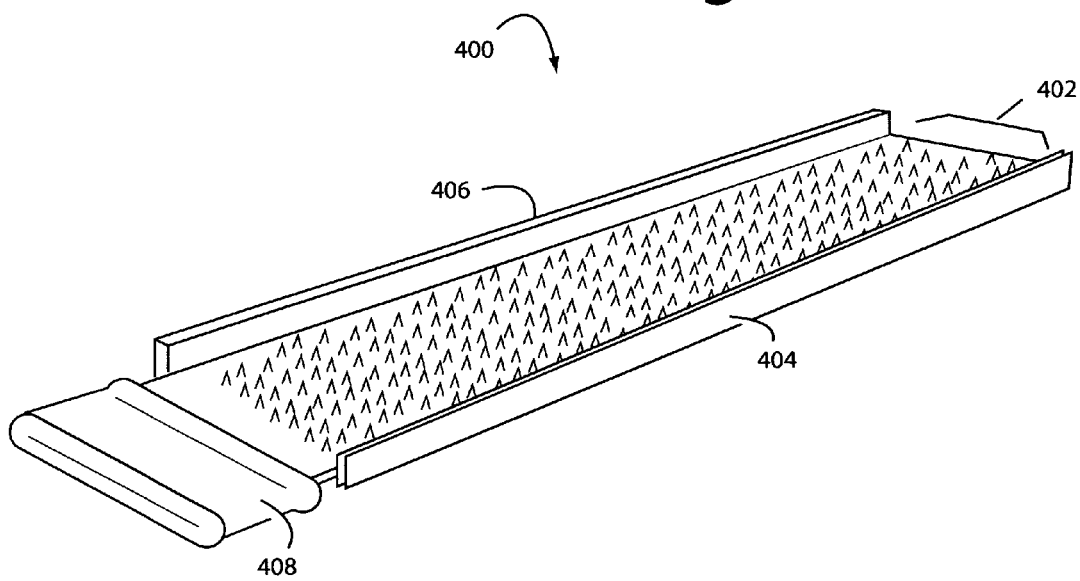
FIG. 4 is a perspective view diagram of a shuttle rasp showing a scraping surface and lips.

FIG. 4 represents a shuttle rasp 400 useful in seed shucking appliance embodiments of the present invention. Here, shuttle rasp 400 has a roughened, scraping surface 402 on one side that is sheltered on its outside edges between protruding longitudinal lips 404 and 406. The roughened, scraping surface 402 is used to rub and/or tear coverings and shucks from the seed kernels of black eyed peas when the shuttle rasp 400 is reciprocated by a user. The longitudinal lips 404 and 406 keep the roughened, scraping surface 402 from snagging anything but the black eyed peas during operation and provide a smoother action. The placement and configuration of longitudinal lips 404 and 406 are such that they maintain a constant, proper gap of about one half diameter of an averaged sized black eye pea between the roughened, scraping surface 402 and the opposing edge of the respective lateral slots. A handle 408 is provided for a user to grip.

An earlier appliance by the present Inventor was described and published in United States Patent Application publication, 2009-0068332, on Mar. 12, 2009, now abandoned. The present Invention represents an advancement and improvement over the earlier designs in that it is simpler, less expensive, easier to clean, easier to use, and is more portable.

Although particular embodiments of the present invention have been described and illustrated, such was not intended to limit the invention. Modifications and changes will no doubt become apparent to those skilled in the art, and it was intended that the invention only be limited by the scope of the appended claims.

The invention is claimed, as follows:

1. A seed-shucking appliance for separating seed coverings from their kernels, comprising:

a tubular body;

a chamber inside said tubular body having an open top end configured to receive a quantity of pre-soaked whole black-eyed peas;

a pair of lateral slots disposed in opposite sides of the chamber and dimensionally configured to permit the expulsion of individual black-eyed pea seed kernels once shucked of their coverings, and dimensionally configured to prevent the loss of individual whole black-eyed peas;

a shuttle rasp configured to fit through and thread between the pair of lateral slots, and provided with a scraping surface configured to grate against said quantity of pre-soaked whole black-eyed peas;

a funnel disposed on the open top end of the chamber such that said quantity of pre-soaked whole black-eyed peas can be loaded inside the chamber during a temporary removal of the shuttle rasp from the pair of lateral slots;

a piston and a spring disposed inside the chamber and arranged to press any quantity of pre-soaked whole black-eyed peas loaded inside the chamber up against said scraping surface of the shuttle rasp;

a removable cap configured to be secured on a bottom end of the chamber; and a cocking mechanism able to move said piston and compress said spring in a retracted position such that said quantity of pre-soaked whole black-eyed peas can be loaded inside the chamber through said funnel, said cocking mechanism comprising:
- two longitudinal slots provided in said tubular body and formed as elongated J-channels to allow a locking action to keep said spring compressed;
- a pair of handles threaded out through said longitudinal slots to allow a user to move said piston; and
- a hook that provides a locking mechanism with said handles that can keep said spring compressed for loading said chamber above said piston.

2. The appliance of claim 1, further comprising: a handle or a knob on one end of the shuttle rasp configured to assist a user to force the shuttle rasp to reciprocate in and out between the pair of lateral slots.

3. The appliance of claim 1, further comprising:
- a pair of glides disposed between the pair of lateral slots and configured to control the movements of the shuttle rasp.

4. The appliance of claim 1, further comprising:
- a pair of lips longitudinally disposed on outside edges of the shuttle rasp.

\* \* \* \* \*